June 3, 1930. W. L. CHAMPION 1,761,904
MOWING ATTACHMENT
Filed Sept. 22, 1928 2 Sheets-Sheet 2
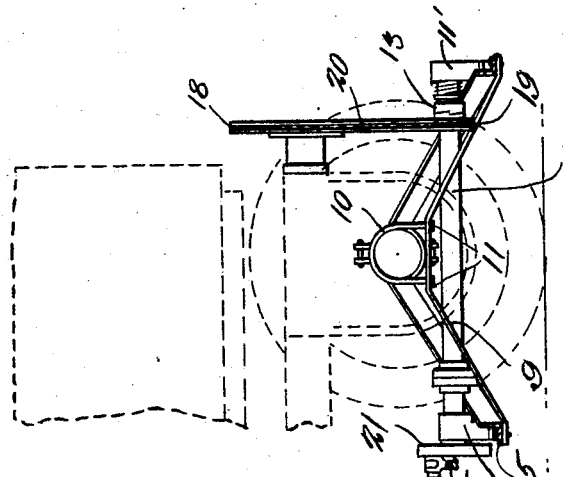
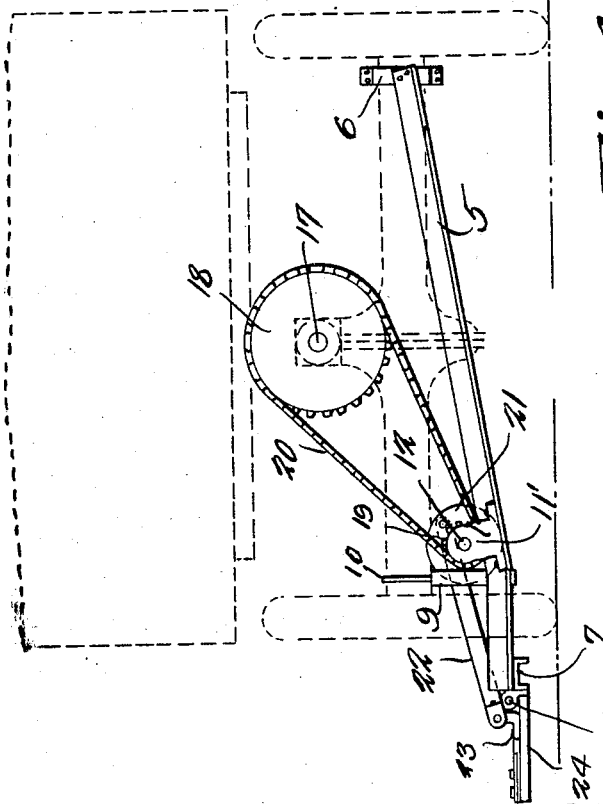
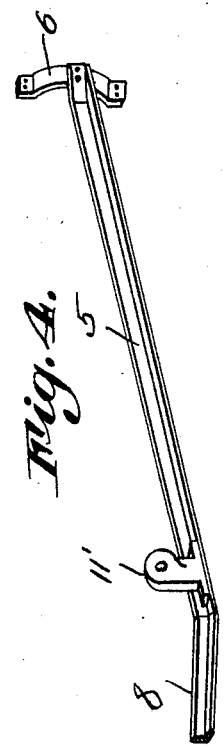
W. L. Champion
Inventor Patented June 3, 1930

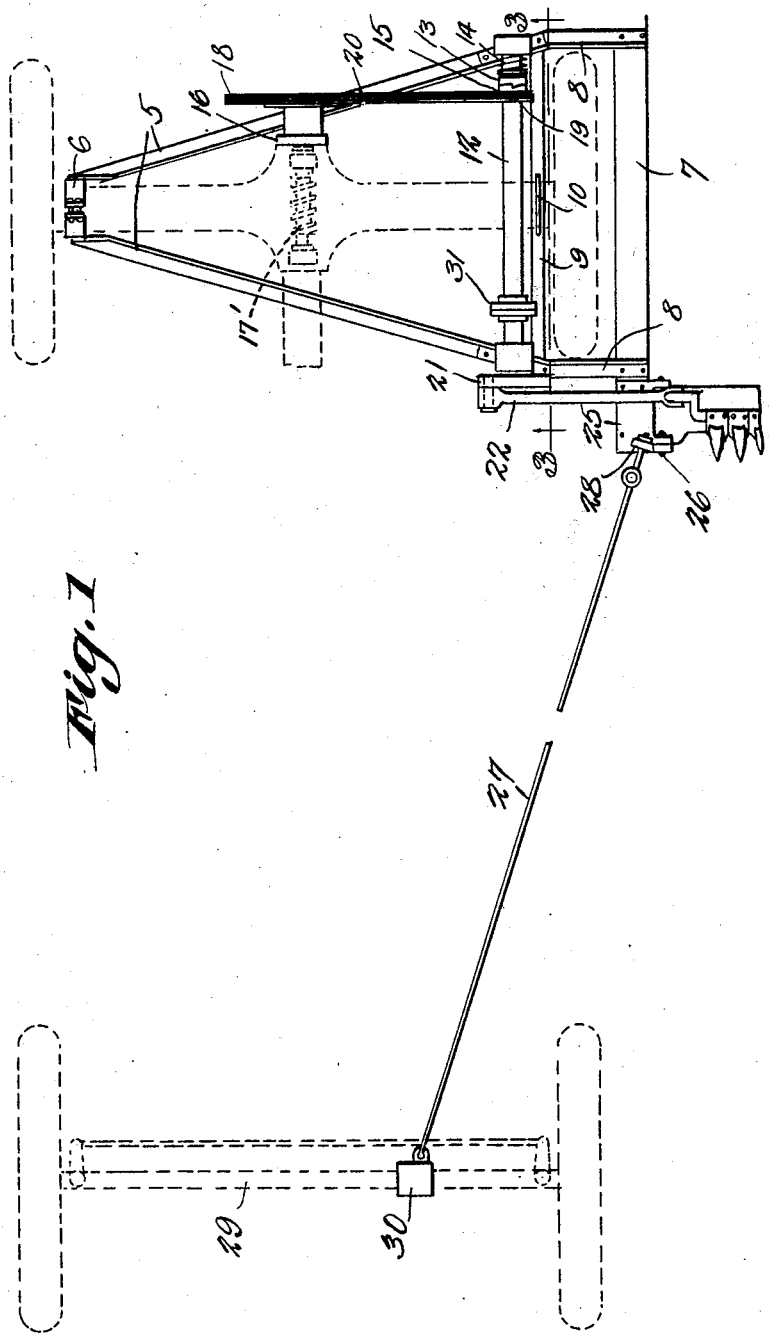

1,761,904

UNITED STATES PATENT OFFICE

WILLIAM L. CHAMPION, OF MUSKOGEE, OKLAHOMA

MOWING ATTACHMENT

Application filed September 22, 1928. Serial No. 307,724.

This invention relates to a mowing attachment for use in connection with motor trucks, tractors or the like, whereby a motor truck or tractor may be converted into a mower, without the necessity of making extensive alterations in the construction of the machine to which the mower is attached.

An object of the invention is to provide attaching means whereby the mower may be readily and easily secured to the rear axle of the machine.

Another object of the invention is the provision of means whereby the machine with its attachment may be backed or moved rearwardly, the cutter bar remaining motionless.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a mower attachment constructed in accordance with the invention, the axles of the machine being shown in dotted lines.

Figure 2 is a rear elevational view thereof.

Figure 3 is a sectional view through the frame of the mower attachment on line 3—3 of Fig. 1.

Figure 4 is a perspective view of one of the bars of the frame of the attachment.

Referring to the drawings in detail, the attachment includes a frame embodying converging angle bars 5 each of which carries a metallic strap 6, which straps are slightly curved and provided with openings at their ends so that they may be positioned around the rear axle housing of a motor truck, tractor or the like, bolts being passed through the straps to secure them in position.

The angle bars 5 are connected at their outer ends by means of the inverted channel bar 7, the ends of the angle bars 5 forming the frame, at points adjacent to the channel bar 7 being substantially straight as at 8, the distance between the bars 5 being such as to permit one of the rear wheels of the machine to which the mower is attached, to operate therebetween.

Spaced from the bar 7 and connected with the bars 5, is a bar 9 that has its central portion lying adjacent to the axle housing and provided with openings to receive the inverted U bolt 10 that passes through openings in the bar 9, where nuts 11 are supplied to secure the bar 9 and side bars 5 of the frame, to the rear axle.

Mounted on the bars 5 are upstanding bearing members 11' in whch the ends of the shaft 12 are positioned, the shaft 12 being supplied with a clutch member 13 loosely mounted on the shaft 12 and secured on the shaft by means of the coiled spring 14 which normally urges the clutch member 13 longitudinally of the shaft.

The reference character 15 designates a clutch member which is also loosely mounted on the shaft 12, the clutch member 15 cooperating with the clutch member 13 to impart rotary movement to the shaft 12, through the coiled spring 14, for purposes to be hereinafter more fully described.

The shaft 12 is sectional, the sections being connected by the frictional coupling 31 which permits slipping of the driven section with respect to the drive section, should the mower become clogged, thereby preventing damage to the machinery.

The usual closure plate of the rear axle housing is removed, and replaced by a plate 16 which is supplied with a bearing to receive the shaft 17 that carries a worm 17' on its inner end meshing with the differential mechanism of the truck, so that movement will be imparted to the shaft 17. Mounted on the shaft 17 is a sprocket 18 constituting the power sprocket of the mower attachment, which sprocket imparts rotary movement to the clutch member 15 through the sprocket 19 and chain 20.

At one end of the shaft 12 is a power wheel 21 to which the link 22 is eccentrically connected, the link 22 having connection with the cutter bar 23 that moves on the cutter bar support 24 which in turn is pivotally connected to the plate 25, at 26. In order that the cutter bar and its support will be held against rearward movement, a brace rod 27 is provided which is adjustably connected to the plate 25, at 28, the opposite end of the rod being connected to the front axle 29 of the machine to which the mower is attached, by means of the collar 30 that embraces a portion of the axle 29.

From the foregoing it will be obvious that due to the construction shown and described the mowing attachment may be readily attached to a motor truck, tractor or the like, and the machine to which it is attached, moved over the ground surface to accomplish the purpose of the invention.

After the attachment has been used, it may be readily detached from the machine and stored, the construction of the attachment being such that it may be readily folded into a small and compact article for storing.

I claim:

1. A mower attachment for motor vehicles, comprising a frame formed of a pair of bars, means for clamping one end of the frame to the rear axle of a motor vehicle, the opposite ends of the bars diverging and extending beyond the side of the truck, straddling one of the wheels of the truck, a power shaft mounted on the frame, means for transmitting power of the motor of the vehicle to the power shaft, and a cutter bar supported by the frame, and means for transmitting power from the power shaft to the cutter bar.

2. A mower attachment for motor vehicles, comprising a frame removably mounted on the rear axle of the vehicle, said frame including spaced bars, means for connecting the inner ends of the bars to the axle of the motor vehicle, the outer ends of the bars extending beyond the side of the vehicle, a cutter bar supported by the frame, a power shaft mounted on the frame, means for transmitting power from the motor vehicle to the power shaft, and means for transmitting power from the power shaft to the cutter bar.

3. In combination with the rear axle and axle housing of a motor vehicle, a shaft extending into the axle housing, means for transmitting power from the rear axle to the shaft, a frame connected to the axle housing, a power shaft supported on the frame, means for transmitting movement of the first mentioned shaft to the power shaft, a cutter bar, and means for transmitting movement of the power shaft to the cutter bar.

In testimony that I claim the foregoing as my own, I have hereto affixed my signature.

WILLIAM L. CHAMPION.